Patented Apr. 8, 1952

2,592,510

UNITED STATES PATENT OFFICE 2,592,510

ADHESIVE COMPOSITION AND PROCESS OF PREPARING THE SAME

George S. Casebolt, Darien, Conn., assignor to American Cyanamid Company, New York, N. Y., a corporation of Maine No Drawing. Application July 21, 1950, Serial No. 175,300

19 Claims. (Cl. 260—29.4)

This invention relates to adhesive compositions, and more particularly, adhesive compositions which are capable of setting at room temperature. This invention further relates to an adhesive composition which comprises an aqueous emulsion of a co-dried mixture of an urea-formaldehyde resin syrup and an aqueous emulsion of polyvinyl acetate. This invention further relates to a quick-clamp, acid-hardenable adhesive composition comprising a co-spray-dried mixture of an urea-formaldehyde resin syrup and an aqueous emulsion of polyvinyl acetate. Still further, this invention relates to a quick-clamp, acid-hardenable, adhesive composition which is particularly adaptable for use in the manufacture of plywood and furniture and in assembly work on fibrous materials and particularly cellulosic fibrous materials in any particular field, where animal glue has been used in the past. In addition to its use on wood and wood products, the adhesives of the present invention may be used in the manufacture of insulation bats where glass fibers, asbestos fibers and the like are used or in the manufacture of paper products, paper bags, cardboard boxes, corrugations and the like.

One of the objects of the present invention is to produce a modified urea-formaldehyde resin adhesive which is capable of setting to a good bond at room temperature in a comparatively short period of time using conventional pressures. A further object of the present invention is to produce this adhesive composition by co-drying the components of the adhesive composition, wherein said process produces an adhesive material with enhanced bonding properties, both with respect to sheer strength and time of clamping at room temperature. A further object of the present invention is to produce, by co-spray-drying the mixture of the components of the composition, an adhesive material which is capable of producing a good bond in a short clamp period at room temperature. A further object of the present invention is to prepare a quick-clamp, acid-hardenable, adhesive composition which is capable of bonding wood in a comparatively short period of time at room temperature, which adhesive has a comparatively long working life at room temperature. A further object of the present invention is to produce an adhesive composition which has a marked degree of water resistance and heat resistance.

These, and other, objects of the present invention will be set forth and discussed more fully hereinbelow.

In the manufacturing of many articles, when adhesive materials must be used, animal glue has been one of the adhesives which has been used in the past, primarily because it has a short clamp time at room temperature. There are, however, certain disadvantages to the use of animal glue itself. These disadvantages reside in the fact that animal glue is not particularly water-resistant and is not crack-resistant, but it is capable of setting at room temperature in a comparatively short clamping period. Many efforts have been made, particularly in those fields where a water-resistant adhesive is required, to find an adhesive which avoids the defects of animal glue, and at the same time gives a good bond in a comparatively short period of time at room temperature.

The adhesive composition of the present invention embodies all of these desirable attributes without any of the undesirable features of animal glue.

In the preparation of the adhesive of the present invention, it is imperative that the two components of the composition be co-dried in order that all of these desirable features be obtained. This co-drying process may be accomplished in a number of different ways: primarily in co-tray drying or in co-spray drying, and preferably the latter. It will be demonstrated, hereinbelow, that if either or both of the components of the adhesive composition are separately dried, and then formed into an aqueous emulsion, they will not, as a unitary composition, produce the results, by far, which are produced when the two materials are co-dried. If one were to spray-dry the urea-formaldehyde syrup and then disperse said resin in the dry state into the aqueous emulsion of the polyvinyl acetate; or if one were to spray-dry the aqueous emulsion of the polyvinyl acetate and then disperse the dry acetate into the resin syrup; or if one were to spray-dry both of the components to a dry state, mix them, and then form an aqueous emulsion of the mixture; one would not derive, in any instance, that adhesive material which the applicant has discovered can be produced by mixing the two components in the liquid state, and then co-spray-drying to form a co-dried mixture which, when blended with water to form an aqueous emulsion, produces the adhesive composition of the present invention.

In the preparation of the adhesive composition of the present invention, it is preferred to use an urea-formaldehyde resin which is prepared by reacting urea and formaldehyde in a mol ratio of 1:1.2–1:2.1 urea to formaldehyde, respectively. For optimum results, it is desired to use a mol ratio of 1:1.5–1:1.9 urea to formaldehyde, respectively. The urea-formaldehyde resin used in the practice of the process of the present invention may be prepared according to a conventional method. In order to illustrate this preparation of an urea-formaldehyde resin, the following example is set forth. This example is solely for the purpose of illustration and should not be interpreted as a limitation on the case, except as indicated by the appended claims. All parts are parts by weight.

UREA-FORMALDEHYDE RESIN 174 parts of a 37% aqueous formaldehyde solution and 62.2 parts of urea are charged into a suitable reaction kettle and the pH of the mixture is adjusted by the use of 10N sodium hydroxide to 7.8–8.0. The mixture is then heated to reflux and is held at that temperature for about 15 minutes. The syrup is then cooled to about 90° C. and 13.8 parts of urea are added, and the pH is then about 5.5–5.8. The mixture is then heated to reflux and then held at that temperature until the viscosity is about 40–70 centipoises, as determined by a Stormer Viscosimeter, using a 50 g. weight. When this viscosity is obtained, the pH is raised to about 7.8–8.0 by addition of a sufficient quantity of triethanolamine, and the syrup is then cooled to about 25° C. The syrup may then be discharged into a blending tank for preparation for use in admixture with the polyvinyl acetate emulsion prior to the spray-drying step.

In order to illustrate the preparation of the adhesive composition itself, the following is set forth solely for the purpose of illustration.

ADHESIVE COMPOSITION 250 parts of the urea syrup prepared above, containing 56% solids, and 85 parts of a polyvinyl acetate aqueous emulsion, containing 55% solids, are blended together in a blending tank, and the mixture is maintained under rapid agitation until the blend is co-spray-dried. The blended syrups may be spray-dried under the following conditions: inlet air temperature, 500° F.; the feed rate, 2 parts per minute; exit air temperature, 190° F. The final spray-dried product is a fine, white, free-flowing powder with an apparent density of about 0.30. A 65% solids solution of the product in water has a viscosity of 4,000 centipoises (Stormer) and a pH of about 7.0 after having been thoroughly mixed for about ½ hour.

The ratio of the resin to the polyvinyl acetate may be varied over a very wide range, and on a solids-weight ratio, one may use anywhere between 1:99–99:1 parts of resin to acetate, respectively. It is preferred, however, to use a weight ratio of resin to acetate within the range of 50:50 and 95:5, respectively, and for optimum results within the range of 70:30–80:20, respectively. For stability purposes, the emulsion should be kept at a pH of at least 7 prior to preparation for use. In preparing the co-spray-dried mixture for use, it is formed into an aqueous emulsion and then it is generally desired to add an acidic material which functions as a curing catalyst to accelerate the cure and thus give quicker bonding at the room temperature application of the adhesive. Any of the acid materials may be used, such as any of the organic or inorganic acids or their acidic salts. Amongst those which may be used are hydrochloric acid, phosphoric acid, sulfuric acid, formic acid, boric acid, acetic acid, maleic acid, tartaric acid, oxalic acid, lactic acid and their acid salts, ammonium chloride, ammonium sulfate, mono- or di-ammonium phosphate, zinc chloride, zinc sulfate, aluminum chloride, ferric chloride, ammonium fluoborate, ammonium fluosilicate, cyanuric chloride, stannous chloride, ammonium thiocyanate and mixtures of the same and the like. The catalyst should not be added to the mixed emulsion until such time as the adhesive is being prepared for actual use, because to do so would tend to cut down the pot life of the adhesive material. The amount of the catalyst which may be used may be varied over a fairly wide range, but generally is present only in catalytic amounts, such as between about 1–12%. Actually, the more catalyst that is used, the faster is the bonding effect, and the shorter is the pot life of the adhesive. It is possible to produce, as a variation of the present invention, a mixture of an acid catalyst and a co-dried mixture of the resin and acetate, which combination, in the dry state, would be stable and which may be emulsified by the subsequent addition of water. It may, in certain instances, be desired to use an acid buffer material in order to keep the pH of the adhesive material from dropping too low, and from diminishing the pot life; and in that event, one could use such acid buffers as tricalcium phosphate and the like. If a buffer is used, the ratio of catalyst to buffer should be approximately 1:1, and such a mixture of ammonium chloride and tricalcium phosphate, for example, in such a ratio could be used in comparatively small amounts, such as in the order of magnitude of about 3 parts of the mixture per 100 parts of solid co-dried resin-acetate combined in 54 parts of water. When the combination of catalyst and buffer is used, one may conveniently use between about 1–5% of the mixture, based on the total weight of the resin solids content.

As a further modification to the adhesive composition, one may use wood flour fillers or walnut shell flour fillers or any one of the other standard conventional amylaceous fillers. Furthermore, one may use pigments to color the adhesive, so as to blend in with the background of the materials being bonded together.

In order to illustrate the effectiveness of the adhesive composition of the present invention, the following chart is set forth, in which tests were made on the co-spray-dried adhesive in varying ratios of parts by weight, in which the time of clamping, and the amount of sheer strength in pounds per square inch required to break the bond is set forth, together with the percentages of wood failure.

It will be noted from these figures, set forth hereinabove, that the effectiveness of the present adhesive is very markedly demonstrated, as contrasted with the same formulation of adhesive which has not been spray-dried.

The spray-drying step, or other drying step, can be accomplished at any conventional drying temperature, and in the spray-drying operation, conventional temperatures of about 400–550° F. may be used. It would appear that as the spray-drying temperature increases, the bonding improves and the shelf life and working life of the product also improves; it is as a consequence desirable to co-spray-dry the resinous composition at the higher temperature levels.

Any polyvinyl acetate may be used in the preparation of the composition of the present inven-

TABLE I

*Effect of physical form of polyvinyl acetate modified urea-formaldehyde resin on clamping time*

| Ratio of UF Resin to PVAc Resin, (Solids Basis) | Physical Form of Resins | Clamping Time at 100 p. s. i.—Minutes | | | | | | | | | | | | | | | | | | | |
|---|---|---|---|---|---|---|---|---|---|---|---|---|---|---|---|---|---|---|---|---|---|
| | | 10 | | | | 15 | | | | 30 | | | | 45 | | | | 60 | | | |
| | | Dry | | 3 Hr. Soak 145° F. | | Dry | | 3 Hr. Soak 145° F. | | Dry | | 3 Hr. Soak 145° F. | | Dry | | 3 Hr. Soak 145° F. | | Dry | | 3 Hr. Soak 145° F. | |
| | | (1) | (2) | (1) | (2) | (1) | (2) | (1) | (2) | (1) | (2) | (1) | (2) | (1) | (2) | (1) | (2) | (1) | (2) | (1) | (2) |
| 90:10 | Liquid UF+Liquid PVAc | (4) | (4) | (4) | (4) | (4) | (4) | (4) | (4) | (4) | (4) | (4) | (4) | (4) | (4) | (4) | (4) | (4) | (4) | (4) | (4) |
| | Dry UF+Liquid PVAc | (4) | (4) | (4) | (4) | (4) | (4) | (4) | (4) | (4) | (4) | (4) | (4) | (4) | (4) | (4) | (4) | 510 | 40 | 400 | 30 |
| | Dry UF+Dry PVAc [3] | (4) | (4) | (4) | (4) | (4) | (4) | (4) | (4) | (4) | (4) | (4) | (4) | (4) | (4) | (4) | (4) | (4) | (4) | (4) | (4) |
| | Co-Spray-Dried UF+PVAc [3] | 520 | 60 | 340 | 0 | 600 | 60 | 370 | 10 | | | | | | | | | | | | |
| 75:25 | Liquid UF+Liquid PVAc | (4) | (4) | (4) | (4) | (4) | (4) | (4) | (4) | (4) | (4) | (4) | (4) | (4) | (4) | (4) | (4) | (4) | (4) | (4) | (4) |
| | Dry UF+Liquid PVAc | (4) | (4) | (4) | (4) | (4) | (4) | (4) | (4) | 520 | 60 | 460 | 60 | 550 | 80 | 520 | 80 | 550 | 100 | 510 | 80 |
| | Dry UF+Dry PVAc [3] | (4) | (4) | (4) | (4) | (4) | (4) | (4) | (4) | 490 | 10 | 460 | 30 | 460 | 50 | 390 | 0 | 570 | 50 | 380 | 0 |
| | Co-Spray-Dried UF+PVAc [3] | 690 | 90 | 340 | 10 | 430 | 80 | 390 | 70 | 440 | 90 | 480 | 90 | 320 | 70 | 450 | 80 | 440 | 10 | 460 | 20 |
| 95:5 | Co-Spray-Dried UF+PVAc [3] | 610 | 30 | 480 | 20 | [5]590 | [5]20 | [5]510 | [5]20 | | | | | | | | | | | | |

[1] P. s. i. at break.
[2] Percent of wood failure.
[3] In aqueous emulsion.
[4] Delaminated.
[5] 20 minutes.

tion. There are a number of methods of preparing these polymers, all of which are well known in the art and it is immaterial which method is selected for the preparation of the polyvinyl acetate. Representative of the processes are those set forth in U. S. Patents 2,388,600, 2,388,602 and 2,398,344.

I claim:

1. A quick-clamp, acid-hardenable, adhesive composition, capable of setting at room temperature, comprising an aqueous emulsion of a co-dried mixture of an urea-formaldehyde resin syrup having a mol ratio of 1:1.2–1:2.1, respectively, and an aqueous emulsion of polyvinyl acetate, said composition having a pH of at least 7.

2. A quick-clamp, acid-hardenable, adhesive composition, capable of setting at room temperature, comprising an aqueous emulsion of a co-spray dried mixture of an urea-formaldehyde resin syrup having a mol ratio of 1:1.2–1:2.1, respectively, and an aqueous emulsion of polyvinyl acetate, said composition having a pH of at least 7.

3. A quick-clamp, acid-hardenable, adhesive composition, capable of setting at room temperature, comprising an aqueous emulsion of a co-spray dried mixture of an urea-formaldehyde resin syrup having a mol ratio of 1:1.2–1:2.1, respectively, and an aqueous emulsion of polyvinyl acetate, wherein said resin and said acetate are present in a solids weight ratio of 50:50–95:5, respectively, said composition having a pH of at least 7.

4. A quick-clamp, acid-hardenable, adhesive composition, capable of setting at room temperature, comprising an aqueous emulsion of a co-dried mixture of an urea-formaldehyde resin syrup having a mol ratio of 1:1.5–1:1.9, respectively, and an aqueous emulsion of polyvinyl acetate, wherein said resin and said acetate are present in a solids weight ratio of 50:50–95:5, respectively, said composition having a pH of at least 7.

5. A quick-clamp, acid-hardenable, adhesive composition, capable of setting at room temperature, comprising an aqueous emulsion of a co-spray dried mixture of an urea-formaldehyde resin syrup having a mol ratio of 1:1.5–1:1.9, respectively, and an aqueous emulsion of polyvinyl acetate, wherein said resin and said acetate are present in a solids weight ratio of 50:50–95:5, respectively, said composition having a pH of at least 7.

6. A quick-clamp, acid-hardenable, adhesive composition, capable of setting at room temperature, comprising an aqueous emulsion of a co-dried mixture of an urea-formaldehyde resin syrup having a mol ratio of 1:1.5–1:1.9, respectively, and an aqueous emulsion of polyvinyl acetate, wherein said resin and said acetate are present in a solids weight ratio of 70:30–80:20, respectively, said composition having a pH of at least 7.

7. A quick-clamp, acid-hardenable, adhesive composition, capable of setting at room temperature, comprising an aqueous emulsion of a co-spray dried mixture of an urea-formaldehyde resin syrup having a mol ratio of 1:1.5–1:1.9, respectively, and an aqueous emulsion of polyvinyl acetate, wherein said resin and said acetate are present in a solids-weight ratio of 70:30–80:20, respectively, said composition having a pH of at least 7.

8. A quick-clamp, acid-hardenable, adhesive composition, capable of setting at room temperature, comprising an aqueous emulsion of a co-dried mixture of an urea-formaldehyde resin syrup having a mol ratio of 1:1.2–1:2.1, respectively, and an aqueous emulsion of polyvinyl acetate, wherein said resin and said acetate are present in a solids-weight ratio of 50:50–95:5, respectively, and an acid catalyst.

9. A quick-clamp, acid-hardenable, adhesive composition, capable of setting at room temperature, comprising an aqueous emulsion of a co-spray dried mixture of an urea-formaldehyde resin syrup having a mol ratio of 1:1.2–1:2.1, respectively, and an aqueous emulsion of polyvinyl acetate, wherein said resin and said acetate are present in a solids-weight ratio of 50:50–95:5, respectively, and an acid catalyst.

10. A quick-clamp, acid-hardenable, adhesive composition, capable of setting at room temperature, comprising an aqueous emulsion of a co-spray dried mixture of an urea-formaldehyde resin syrup having a mol ratio of 1:1.5–1:1.9, respectively, and an aqueous emulsion of polyvinyl acetate, wherein said resin and said acetate are present in a solids-weight ratio of 50:50–95:5, respectively, and an acid catalyst.

11. A quick-clamp, acid-hardenable, adhesive composition, capable of setting at room temperature, comprising an aqueous emulsion of a co-spray dried mixture of an urea-formaldehyde resin syrup having a mol ratio of 1:1.5–1:1.9, respectively, and an aqueous emulsion of polyvinyl acetate, wherein said resin and said acetate are present in a solids-weight ratio of 70:30–80:20, respectively, and an acid catalyst.

12. A quick-clamp, acid-hardenable, adhesive composition capable of setting at room temperature, comprising a co-dried mixture of an urea-formaldehyde resin syrup having a mol ratio of 1:1.2–1:2.1, respectively, and an aqueous emulsion of polyvinyl acetone, wherein said resin and said acetate are present in a solids-weight ratio of 50:50–95:5, respectively, and an acid catalyst.

13. A quick-clamp, acid-hardenable, adhesive composition, capable of setting at room temperature, comprising a co-spray dried mixture of an urea-formaldehyde resin syrup having a mol ratio of 1:1.2–1:2.1, respectively, and an aqueous emulsion of polyvinyl acetate, wherein said resin and said acetate are present in a solids-weight ratio of 50:50–95:5, respectively, and an acid catalyst.

14. A quick-clamp, acid-hardenable, adhesive composition, capable of setting at room temperature, comprising a co-spray dried mixture of an urea-formaldehyde resin syrup having a mol ratio of 1:1.5–1:1.9, respectively, and an aqueous emulsion of polyvinyl acetate, wherein said resin and said acetate are present in a solids-weight ratio of 50:50–95:5, respectively, and an acid catalyst.

15. A quick-clamp, acid-hardenable, adhesive composition, capable of setting at room temperature, comprising a co-spray dried mixture of an urea-formaldehyde resin syrup having a mol ratio of 1:1.5–1:1.9, respectively, and an aqueous emulsion of polyvinyl acetate, wherein said resin and said acetate are present in a solids-weight ratio of 70:30–80:20, respectively, and an acid catalyst.

16. A process for preparing a quick-clamp, acid-hardenable, adhesive composition, capable of setting at room temperature, comprising mixing an urea-formaldehyde resin syrup, wherein said resin has a mol ratio of 1:1.2–1:2.1, respectively, and an aqueous emulsion of polyvinyl acetate, co-drying the mixture, and emulsifying the co-dried mixture in water, wherein said resin and said acetate are present in a weight-ratio of 50:50–97:3, respectively.

17. A process for preparing a quick-clamp, acid hardenable, adhesive composition, capable of setting at room temperature, comprising mixing an urea-formaldehyde resin syrup, wherein said resin has a mol ratio of 1:1.2–1:2.1, respectively, and an aqueous emulsion of polyvinyl acetate, co-spray drying the mixture, and emulsifying the co-spray dried mixture in water, wherein said resin and said acetate are present in a weight ratio of 50:50–97:3, respectively.

18. A process for preparing a quick-clamp, acid-hardenable, adhesive composition, capable of setting at room temperature, comprising mixing an urea-formaldehyde resin syrup, wherein said resin has a mol ratio of 1:1.5–1:1.9, respectively, and an aqueous emulsion of polyvinyl acetate, co-spray drying the mixture, and emulsifying the co-spray dried mixture in water, wherein said resin and said acetate are present in a weight ratio of 50:50–97:3, respectively.

19. A process for preparing a quick-clamp, acid-hardenable, adhesive composition, capable of setting at room temperature, comprising mixing an urea-formaldehyde resin syrup, wherein said resin has a mol ratio of 1:1.5–1:1.9, respectively, and an aqueous emulsion of polyvinyl acetate, co-spray drying the mixture, and emulsifying the co-spray dried mixture in water, wherein said resin and said acetate are present in a weight ratio of 70:30–80:20, respectively.

GEORGE S. CASEBOLT.

REFERENCES CITED

The following references are of record in the file of this patent:

UNITED STATES PATENTS

| Number | Name | Date |
| --- | --- | --- |
| 2,187,383 | Ludwig | Jan. 16, 1940 |
| 2,312,210 | Dearing | Feb. 23, 1943 |